United States Patent [19]

Crowther

[11] Patent Number: 4,651,205
[45] Date of Patent: Mar. 17, 1987

[54] TELEVISION TRANSMISSION SYSTEM
[75] Inventor: Gerald O. Crowther, Sutton, England
[73] Assignee: U.S. Philips Corporation, New York, N.Y.
[21] Appl. No.: 622,600
[22] Filed: Jun. 20, 1984
[30] Foreign Application Priority Data
Jun. 20, 1983 [GB] United Kingdom ............... 8316750
[51] Int. Cl.⁴ ..................... H04N 7/167; H04N 7/16; H04K 1/00
[52] U.S. Cl. ...................................... 380/14; 380/19; 380/20
[58] Field of Search ............... 358/121, 122, 123, 114; 178/22.08–22.19

[56] References Cited
U.S. PATENT DOCUMENTS

| | | | |
|---|---|---|---|
| 4,070,693 | 1/1978 | Shutterly | 358/123 |
| 4,245,245 | 1/1981 | Matsumoto | 358/121 |
| 4,266,243 | 5/1981 | Shutterly | 358/121 |
| 4,424,532 | 1/1984 | den Toonder | 358/121 |
| 4,484,027 | 11/1984 | Lee et al. | 358/122 |
| 4,547,802 | 10/1985 | Fogarty et al. | 358/123 |

Primary Examiner—Stephen C. Buczinski
Assistant Examiner—Melissa Koltak
Attorney, Agent, or Firm—Thomas A. Briody; Jack Oisher; William J. Streeter

[57] ABSTRACT

In a television receiver for a transmission system in which the video signal is scrambled to allow only for its authorized reception, a video signal processor (8) is provided in which the scrambled video signal is descrambled. A low rate control data signal present at an output (11) of a sound/data signal processor (10) is employed to periodically set (say once every one or two seconds) a master pseudo random pulse generator (12B) producing an output of pseudo random configuration at frame rate which is used to periodically set a video slave pseudo random pulse generator (15) to produce an output of pseudo random configuration at line frequency. This is applied to an input S of the processor (9) and forms the scrambling key for the line-by-line de-scrambling of the video signal. The arrangement has the advantage that the high rate scrambling key is not produced by the first generator (12B) where this generator forms part of a sub-system (13) and so prevents high rate data being present across the sub-system interface.

15 Claims, 2 Drawing Figures

TELEVISION TRANSMISSION SYSTEM

BACKGROUND OF THE INVENTION

The present invention relates to a television transmission system in which the video components of a transmitted television signal are scrambled to allow only for their authorized reception, a video scrambling key being provided for the line-by-line scrambling or de-scrambling of said video components, said video scrambling key comprising a first pulse signal having a first pseudo random configuration generated at a first rate which corresponds to that of the line frequency, the first pulse signal being periodically set, in response to control data having a rate which is low compared with that of the line frequency, to a particular pulse configuration which first pulse signal thereafter is stepped in accordance with its random configuration. The invention also relates to transmission and receiver equipment for use with such a system.

A system of the above type is known where each line of the video components of a television signal is scrambled by cutting the line and changing the cut-point for each line. This is done in a random manner by a locally generated random video scrambling key at the transmission source and a corresponding random video scrambling key locally generated in the television receiver. Both scrambling keys are periodically reset by control data at a rate which is low relative to that of the line rate of the television signal, which control data is transmitted with the television signal. Such a method provides a relatively secure scrambling system for the video components. Providing the scrambling key for such a system line rate presents little or no problem in transmission equipment but a problem is present in a receiver if it incorporates a separate sub-system, which could be in the form of a card carrying an integrated circuit capable of being inserted into an appropriate place of a television receiver. The problem is that data at a high data rate (up to 20.25M bits/second in the case of a C-MAC television signal) would need to be conveyed between the card and the receiver and vice versa which is not as practical as might first appear.

SUMMARY OF THE INVENTION

It is an object of the present invention to obviate the above difficulty.

The invention provides a television transmission system in which the video components of a transmitted television signal are scrambled to allow only for their authorized reception, a video scrambling key being provided for the line-by-line scrambling or de-scrambling of said video components said video scrambling key comprising a first pulse signal having a first pseudo random configuration generated at a first rate which corresponds to that of the line frequency, the first pulse signal being periodically set, in response to control data having a rate which is low compared with that of the line frequency, to a particular pulse configuration, which first pulse signal thereafter is stepped in accordance with its random configuration, characterized in that said system additionally comprises a second pulse signal having a second pseudo random configuration generated at a second rate which lies between that of said control data and the line frequency, the second pulse signal being periodically set by said control data to a particular pulse configuration, which second pulse signal thereafter is stepped in accordance with its random configuration while said first pulse signal is periodically set by said second pulse signal.

If the television signal additionally contains a digitally modulated sound or data component which is scrambled to allow only for its authorized reception, a second scrambling key may be provided for the scrambling or de-scrambling of said sound or data component, said second scrambling key comprising a third pulse signal having a third pseudo random configuration generated at a third rate appropriate to the sound or data component, the third pulse signal being periodically set by said second pulse signal to a particular pulse configuration, which third pulse signal thereafter is stepped in accordance with its random configuration.

The second pulse signal may have a rate which corresponds to the frame frequency of said transmission system. The control data may be conveyed in encrypted form as an encryption key which forms part of the transmitted television signal.

The invention further provides television transmission equipment for generating a television signal for use with the above television transmission system, said equipment comprising a source of video components, means for performing line-by-line scrambling of said video components, under the control of a vision scrambling key, to allow only for their authorized reception, means for generating control data at a rate which is low compared with the line frequency of said television signal, means for generating a first pulse signal having a first pseudo random configuration at a first rate corresponding to that of said line frequency, which first pulse signal forms the vision scrambling key, means for periodically setting said first pulse signal, in response to said control data, to a particular pulse configuration, which first pulse signal is thereafter stepped in accordance with its random configuration, and means for applying said scrambled video components as part of a television signal to a transmission medium, characterized in that said equipment additionally comprises means for generating a second pulse signal having a second pseudo random configuration at a second rate which lies betwen that of said control data and the line frequency, means for periodically setting said second pulse signal by said control data, and means for periodically setting said first pulse signal by said second pulse signal.

Such transmission equipment may additionally comprise a source of digitally modulated sound or data component, means for scrambling said sound/data component, under the control of a second scrambling key, to allow only for authorized reception, means for generating a third pulse signal having a third pseudo random configuration at a third rate appropriate to the sound/data component, which third pulse signal forms the second scrambling key, means for periodically setting the third pulse signal by said control data to a particular pulse configuration, which third signal thereafter is stepped in accordance with its random configuration, and means for applying said scrambled sound/data component as part of said television signal to said transmission medium.

The means for generating said second pulse signal may generate this second pulse signal at a rate corresponding to the frame frequency of said television signal. Such equipment may further comprise means for encrypting said control data to form an encryption key which encryption key, forms part of the television signal.

The invention also provides television receiver equipment for use with the above television transmission system in which the video components of a television signal are scrambled to allow only for their authorized reception, said equipment comprising means for receiving said television signal and for deriving the scrambled video components therefrom, means for performing line-by-line descrambling of said scrambled video components under the control of a video scrambling key, means for generating a first pulse signal, having a first pseudo random configuration, at a first rate corresponding to that of the line frequency, which first pulse signal forms said video scrambling key, means for periodically setting said first pulse signal, in response to received control data having a rate which is low compared with that of the line frequency, to a particular pulse configuration, and which first pulse signal is thereafter stepped in accordance with its random configuration, characterized in that said equipment additionally comprises means for generating a second pulse signal, having a second pseudo random configuration, at a second rate which lies between that of said control data and the line frequency, means for periodically setting said second pulse signal by said control data, and means for periodically setting said first pulse signal by said second pulse signal.

If the television signal additionally contains a digitally modulated sound or data component which is scrambled to allow only for its authorized reception, the receiver equipment may additionally comprise means for deriving said scrambled data component, means for descrambling said scrambled sound/data component under the control of a second scrambling key, means for generating a third pulse signal, having a third pseudo random configuration, at a third rate appropriate to the sound/data component, which third pulse signal forms said second scrambling key, and means for periodically setting said third pulse signal by said second pulse signal to a particular pulse configuration which third pulse signal thereafter is stepped in accordance with its random configuration.

The means for generating said second pulse signal may generate that signal at a rate which corresponds to the frame frequency of the television signal. In addition, the control data may be conveyed in encrypted form as an encryption key in the television signal, the equipment then further comprising means for deriving the encryption key from the television signal and means for decrypting the encryption key to produce the control data.

BRIEF DESCRIPTION OF THE DRAWINGS

The above and other features of the invention will be more readily understood from the following description with reference to the accompanying drawings, in which.

DESCRIPTION OF THE PREFERRED EMBODIMENT

Figure 1:
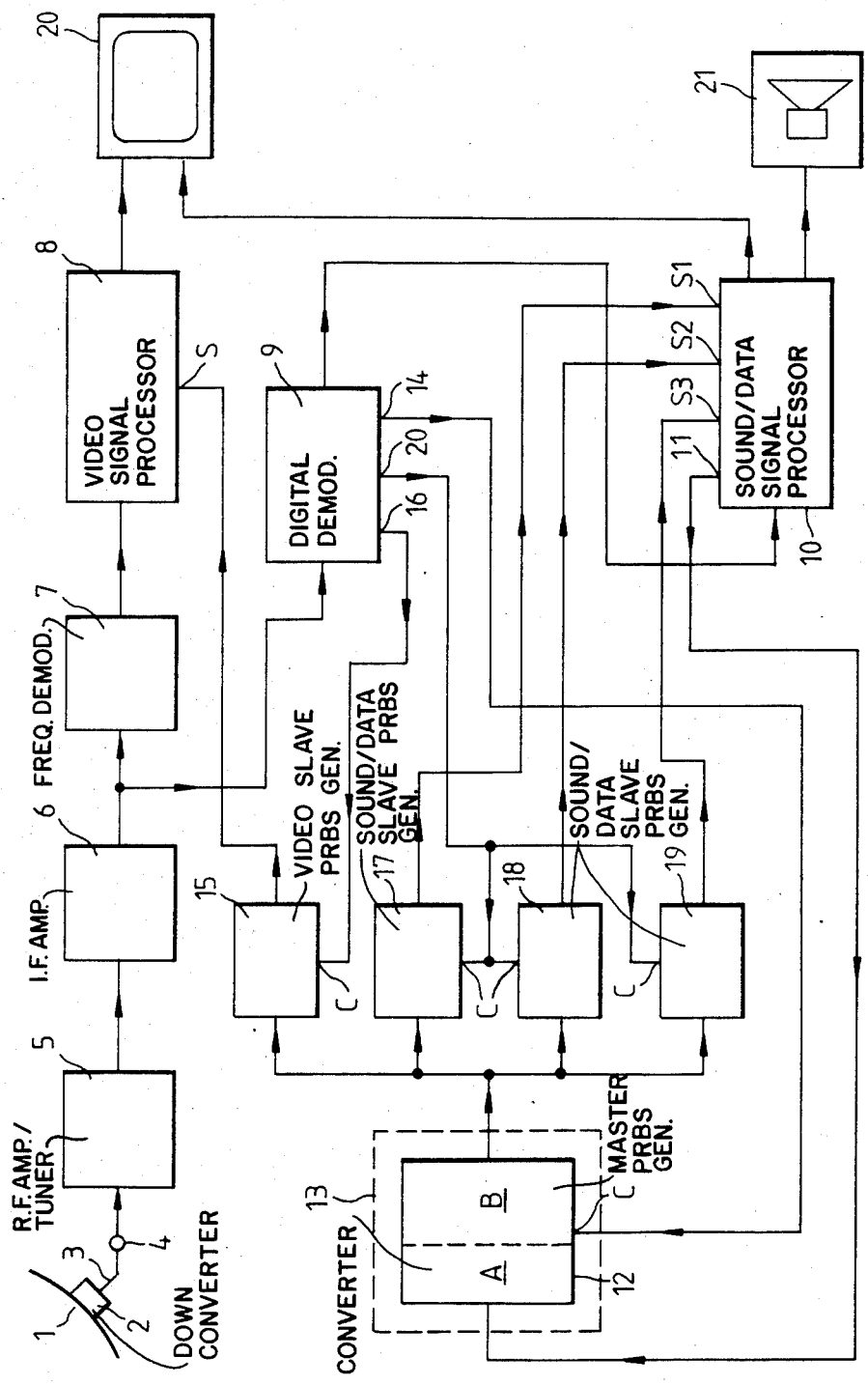
FIG. 1 is a block diagram of a television receiver for use with the present invention.

FIG. 1 shows a block diagram of a television receiver for use with a direct broadcast satellite television transmission system and, in the case of FIG. 1, it is assumed the system used is the C-MAC system along the lines disclosed in the Independent Broadcasting Authorities Experimental Development Report 118/82, entitled "MAC—A Television System for High-Quality Satellite Broadcasting", dated August 1982, pages 6 to 9 of that report disclosing a C-MAC system each television line of which sequentially contains a period of digital sound/data information, a period of compressed chrominance information and a period of compressed luminance information. Each television line is effectively divided into 1296 sample periods at a sampling rate of 20.25M bits/second and page 7 contains a table indicating the number of samples alloted to each component. Since the publication of the above report, the number of samples alloted to the various components has been amended but this is not important for an understanding of the present invention. A draft technical standard for a C-MAC Packet system containing these changes appears in the European Broadcasting Union document SPB 284 dated June 1983 "Draft New Report—Television Standards for 625 line, 12 GHz Satellite Broadcasting".

In FIG. 1, the reference 1 indicates a dish aerial suitable for receiving satellite television signals in the 12 GHz band, the aerial having a down converter 2 attached to it which frequency converts the incoming television signal to a frequency within the 1 to 2 GHz band, depending, of course, on the frequency of the incoming signal. The down converted signal is applied over a co-axial cable 3 to a terminal 4 forming the input for the television receiver, this terminal 4 being connected to an r.f. amplifier and frequency changer (tuner) stage 5 which amplifies and transforms the incoming signal to a suitable i.f. frequency of, for example, 134 MHz, which is then further amplified by an i.f. amplifier 6. The output of the amplifier 6 is applied to a frequency demodulator 7, as the video components of the broadcast satellite television signal are frequency modulated, the demodulated output of the demodulator 7 being applied to a video signal processor 8 in which the compressed chrominance and luminance components are processed such that they are expanded to occupy a line period and available simultaneously. Under certain circumstances, signals received by the aerial 1 will be scrambled so as to permit only authorized subscribers to receive the incoming signals in an intelligible manner, in which case, the video processor 8 will need to incorporate a de-scrambling stage in which the scrambled video components are restored to their normal state. One suitable method of scrambling the video components is known as "line cut," where the chrominance and luminance components for each television line are each cut at randomly determined positions such that each component is divided and the positions of the divided components transposed such that the latter part of a component (that part after the cut) appears before the first part of that component. The cut will not be at the same place in each line but may be made at one of a possible 256 positions. A scrambling key will then be required, which is the same at the transmitter as at the receiver, to provide the necessary information as to where the cut actually takes place, and such a key for a possible 256 cut positions per line will need to be an 8 bit binary word per television line. In FIG. 1, such an 8 bit word is applied to the input S of the video signal processor 8.

The output of the i.f. amplifier 6 is also applied to a digital demodulator stage 9 where the incoming digital signals which are 2–4 PSK modulated are converted to normal binary form and from which synchronizing information and various clock frequencies are produced. The binary signal output from the digital demodulator stage 9 is applied to a sound/data signal processor 10 in which the various sound and data channels transmitted with the C-MAC signal are separated one from the other and further processed. As in the case with the video signal, some or all of the sound/data channels may also be scrambled to prevent unauthorized reception of this information, and again it will be necessary to provide a scrambling key or keys for these sound/data channels to ensure their de-scrambling. The sound/data channels may be assembled in a structure map system or may be packet multiplexed. A scrambling technique which can be used with the digital sound/data channels is that where the unscrambled digital signal is added to a pseudo random sequence by means of an exclusive OR-gate.

In order to reproduce the various scrambling keys required in the receiver, a slow rate encryption is transmitted with the broadcast television signal, preferably with the sound/data components, and which is hence received by the aerial 1, a suitable rate for this encryption being one byte per second or one byte every two seconds with each byte containing, say, 64 bits to the Data Encryption Standard (D.E.S.). This encryption key is separated from the incoming digital information by the sound/data processor 10 and appears at an output 11 of that processor for application to an integrated circuit 12 which may be mounted on a plastic card (of a similar size to a credit card) which the subscriber obtains and which is inserted into an appropriate aperture in the television receiver, which aperture contains suitable connections which make contact with corresponding contacts on the card. The card itself is indicated by the broken line 13. The integrated circuit 12 contains a converter 12A which produces the inverse of the D.E.S. algorithm to provide de-encrypted control data as a trigger for a master pseudo random (PRBS) generator 12B forming part of the integrated circuit 12. The master PRBS generator 12B is a pseudo random number generator which may be a highly secure pseudo random generator according to the Data Encryption Standard, producing output sequence of bytes at a rate of one byte per television frame, each byte having a pseudo random configuration of 64 bits. The master PRBS generator 12B is set either once per second or once every two seconds, in response to the encryption key, to a particular pulse configuration with the output sequence thereafter being stepped in accordance with its random configuration. In addition, it will be necessary to provide clocking pulses for the master PRBS 12B at the appropriate frequency of 1.6 KHz, which pulses are obtained from an output 14 of the demodulator stage 9 and applied to a clock input C of the integrated circuit 12. In this way, data being transferred between the television receiver and the master PRBS generator 12B on the card 13 are at suitable low rates, which rates are substantially lower than the sampling rate of 20.25M bits/second of the C-MAC system or the sound/data rate for one channel (352K bits/second). The output from the master PRBS generator 12B is applied to a slave pseudo random bit sequence generator 15 for the video signal (video slave PRBS) generator which may also be of a highly secure type and producing one byte of 8 bits per television line. The output of the video slave PRBS generator 15 is applied to the input S of the video signal processor 8 and forms the scrambling key for the scrambled video signal. The output of the video slave PRBS generator 15 has a pseudo random configuration which is set once per frame to a particular pulse configuration by the output of the master PRBS generator 12B, whereafter, the video slave PRBS generator output is stepped in accordance with its random configuration. A clock signal of 125 KHz is derived from an output 16 of the demodulator stage 9 and applied to the clock input C of the vision slave PRBS 15.

The output of the master PRBS generator 12B is also applied to a number of slave pseudo random pulse sequence generators for the sound and data channels (sound/data PRBS generators) depending on the number of such channels subjected to scrambling. In FIG. 1, three such sound/data slave generators are shown indicated by the references 17, 18 and 19 and which are respectively associated with first and second sound channels (sound (I), sound (II) and a data channel. The slave generators 17, 18 and 19 may be of a similar type to that of the slave PRBS generator 15, but the rate at which they produce their pseudo random configuration will depend upon the nature of the signals being processed in the sound/data signal processor to inputs S1, S2 and S3 of which the respective outputs of the slave generators 17, 18 and 19 are applied as respective scrambling keys for the sound/data channels. As with the video slave PRBS generator 15, the sound/data slave generators are periodically set at the frame rate by the output of the master PRBS generator 12B. The sound/data slave generators 17, 18 and 19 also receive pulse trains of a clock frequency at their clock inputs C from an output 20 of the demodulator stage 9, the clock frequency being dependent on the rate at which the scrambling keys are to be produced.

The output of the video signal processor 8 is shown in FIG. 1 to be applied to a display arrangement 20 where the expanded and de-scrambled video components are employed to produce a television display. An output of the sound/data processor 10 is shown connected to a loud-speaker system 21 where the appropriate sound channel is reproduced while a further output of this processor 10 is shown applied to the display 20 for the display of data material such as teletext.

Figure 2:
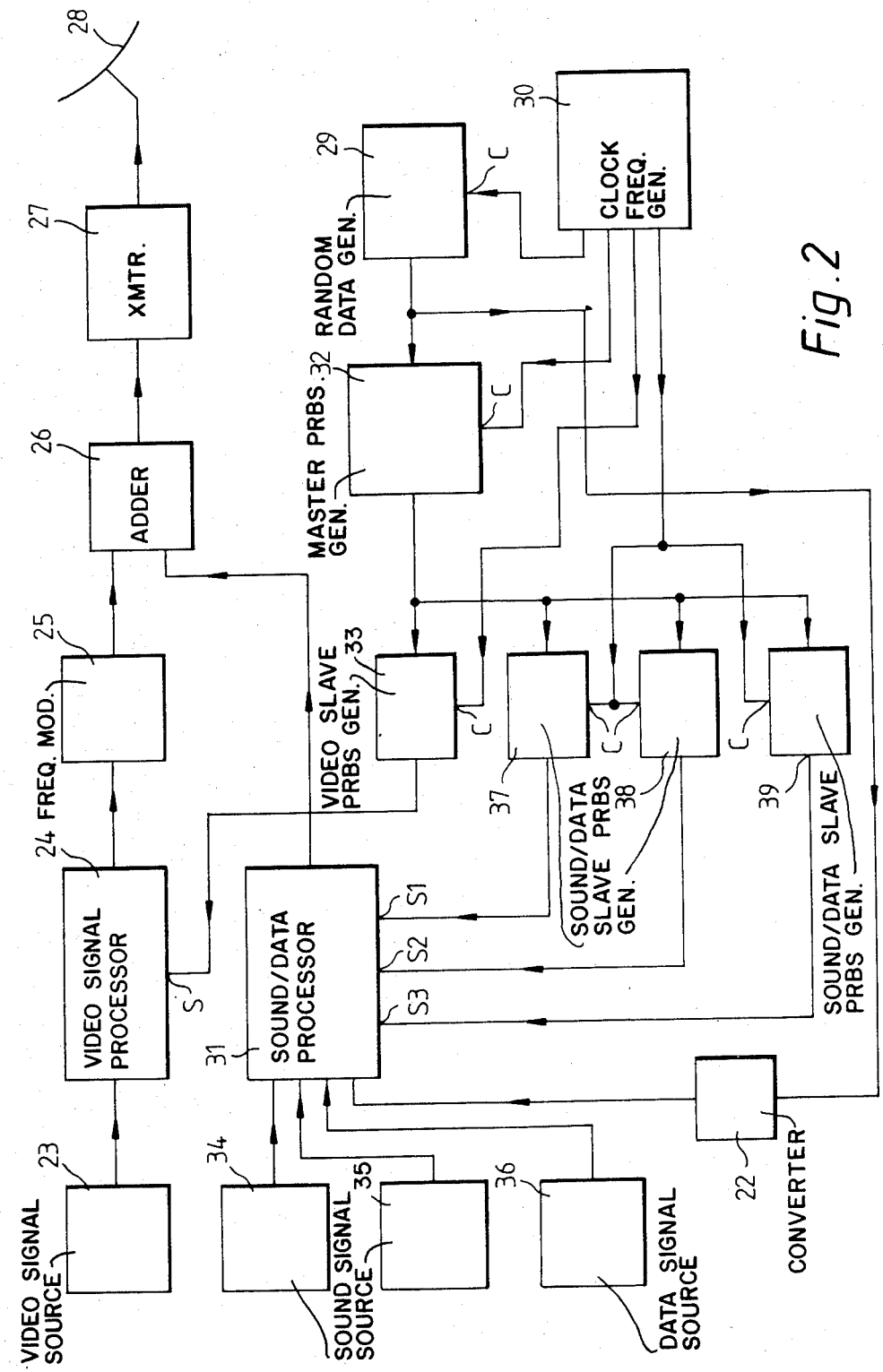
FIG. 2 is a block diagram of a television transmitter for use with the present invention.

Television transmission equipment for use with the present invention is shown in FIG. 2, in which a video signal source 23, which may be a television camera or a video tape recorder, has its output connected to a video signal processor 24 in which, if the signal is for the C-MAC system, the chrominance and luminance components will be compressed in the known manner. In addition, if the video signal is to be scrambled (such as by the above described "line cut" method), the scrambling of the video components will also take place in the video signal processor 24. The outputs from the video signal processor 24 is applied to a frequency modulator 25 and the modulated output therefrom applied to a suitable transmitter 27 via an adder circuit 26, the transmitter 27 producing a modulated output in the 12 GHz band which will be applied to a suitable aerial system 28 from which it can be beamed-up to the satellite. In order to generate the necessary scrambling key for the scrambling of the video signal, a random control data signal is generated by a random data generator 29, which control signal is the same as that required in the receiver in FIG. 1, the rate at which the control signal is generated being controlled by clock pulses received at an input C from a clock frequency generator 30 which produces clock pulses at this and other frequencies. The control signal from random data generator 29 is applied to a converter stage 22 where the control signal is encrypted according to the Data Encryption Standard to produce an encryption key. This encryption key is applied to an input of a sound/data signal processor 31 where the encryption key is inserted either once per second or once every two seconds in the sound/data componenets of the C-MAC signal. The 2-4 PSK modulated output of the sound/data processor 31 is applied to a second input of the adder circuit 26 for addition to the video components prior to transmission.

The random signal from the control data generator 29 is also applied to a master pseudo random binary sequence generator (PRBS) generator 32 which is of the same type and produces the same pseudo random output as the corresponding master PRBS generator 12B in the receiver and which is set at the same time as that in the receiver to the same particular pulse configuration. Clock signals of frequency 1.6 KHz are applied to the clock input C of the master PRBS generator 32 from the clock frequency generator 30. The output of the master PRBS generator 32 is at frame rate and is applied to a video slave pseudo random binary sequence generator 33 which is of the same type and produces the same pseudo random output as the corresponding video slave PRBS generator 15 in the receiver. This produces the same 8 bits per byte pseudo random sequence with one byte appearing on each line, the video slave PRBS generator 33 being periodically set at the same time as the video slave PRBS generator 15 in the receiver to the same particular pulse configuration. The output of the video slave PRBS generator 33 forms the scrambling key for the scrambling of the video signal and is applied to an input S of the video signal processor 24 to control the line cut point for each television line.

Sources of sound signals 34 and 35 (sound I and sound II) are also applied to the sound/data signal processor 31 as is a data signal source 36, the sound/data signal processor 31 processing the various inputs into suitable form depending on the type of system used with the transmission. These sound and data signals may also be scrambled to prevent unauthorized reception, and, for this purpose, the output of the master PRBS generator 32 is applied to respective sound/data slave pseudo random binary sequence generators (sound/data slave PRBS) generators 37, 38 and 39 which correspond with the slave PRBS generators 17, 18 and 19 in the receiver and produce corresponding outputs which are set to particular pulse configurations at the same time as for those in the receiver. The outputs of these sound/data slave PRBS generators 37, 38 and 39 are applied to respective inputs S1, S2 and S3 of the sound/data processor 31 to form the scrambling keys for the scrambling of the sound and data channels. In the same way as for the receiver in FIG. 1, the video and sound/data slave PRBS generators 33, 37, 38 and 39 will receive clock signals at their clock inputs C, that for the video slave PRBS generator 33 being at 125 KHz and derived from an output of the clock frequency generator 30 whilst that for the remaining slave PRBS generators 37, 38 and 39 being at the clock frequency appropriate frequency as previously described and also being derived from the generator 30.

I claim:

1. A television transmission system in which the video components of a transmitted television signal are scrambled to allow only for their authorized reception, a video scrambling key being provided for the line-by-line scrambling or de-scrambling of said video components, said video scrambling key comprising a first pulse signal, having a first pseudo random configuration, generated at a first rate which corresponds to that of the line frequency, the first pulse signal being periodically set, in response to the control data having a rate which is low compared with that of the line frequency, to a particular pulse configuration, which first pulse signal thereafter is stepped in accordance with its random configuration, characterized in that said system additionally comprises a second pulse signal, having a second pseudo random configuration, generated at a second rate which lies between that of said control data and the line frequency, the second pulse signal being periodically set, by said control data, to a particular pulse configuration, which second pulse signal thereafter is stepped in accordance with its random configuration while said first pulse signal is periodically set by said second pulse signal.

2. A system as claimed in claim 1, characterized in that said television signal additionally contains a digitally modulated sound or data component which is scrambled to allow only for its authorized reception, a second scrambling key being provided for the scrambling or de-scrambling of said sound or data component, said second scrambling key comprising a third pulse signal having a third pseudo random configuration generated at a third rate appropriate to the sound or data component, the third pulse signal being periodically set, by said second pulse signal, to a particular pulse configuration, which third pulse signal thereafter is stepped in accordance with its random configuration.

3. A system as claimed in claim 1 or 2, characterized in that the second pulse signal has a rate which corresponds to the frame frequency of said television signal.

4. A system as claimed in claim 1, or 2 characterized in that said control data is conveyed in encrypted form as an encryption key which forms part of the transmitted television signal.

5. Television transmission equipment for generating a television signal for use in a television transmission system in which the video components of a transmitted television signal are scrambled to allow only for their authorized reception, said equipment comprising a source of video components, means for performing line-by-line scrambling of said video components, under the control of a video scrambling key, to allow only for their authorized reception, means for generating control data at a rate which is low compared with the line frequency of said television signal, means for generating a first pulse signal, having a first pseudo random configuration, at a first rate corresponding to that of said line frequency, said first pulse signal forming the video scrambling key, means for periodically setting said first pulse signal, in response to said control data, to a particular pulse configuration, which first pulse signal is thereafter stepped in accordance with its random configuration, and means for applying said scrambled video components as part of a television signal to a transmission medium, characterized in that said equipment additionally comprises means for generating a second pulse signal, having a second pseudo random configuration, at a second rate which lies between that of said control data and the line frequency, means for periodically setting said second pulse signal by said control data, and means for periodically setting said first pulse signal by said second pulse signal.

6. Transmission equipment as claimed in claim 5, characterized in that said equipment additionally comprises a source of digitally modulated sound or data component, means for scrambling said sound/data component under the control of a second scrambling key to allow only for authorized reception, means for generating a third pulse signal, having a third pseudo random configuration, at a third rate appropriate to the sound-/data component, which third pulse signal forms the second scrambling key, means for periodically setting the third pulse signal by said control data to a particular pulse configuration, which third signal thereafter is stepped in accordance with its random configuration, and means for applying said scrambled sound/data component as part of said television signal to said transmission medium.

7. Transmission equipment as claimed in claim 5 or 6, characterized in that said means for generating said second pulse signal generates said second pulse signal at a rate corresponding to the frame frequency of said television signal.

8. Transmission equipment as claimed in claims 5, or 6 chacterized in that said equipment further comprises means for encrypting said control data to form an encryption key, which encryption key forms part of the television signal.

9. Television receiving equipment for use with a television transmitter as claimed in claim 5, in which the video components of a television signal are scrambled to allow only for their authorized reception, said equipment comprising means for receiving said television signal and for deriving the scrambled video components therefrom, means for performing line-by-line descrambling of said scrambled video components under the control of a video scrambling key, means for generating a first pulse signal having a first pseudo random configuration at a first rate corresponding to that of the line frequency, said first pulse signal forming said video scrambling key, means for periodically setting said first pulse signal, in response to received control data having a rate which is low compared with that of the line frequency, to a particular pulse configuration, and which first pulse signal is thereafter stepped in accordance with its randon configuration, characterized in that said equipment additionally comprises means for generating a second pulse signal, having a second pseudo random configuration, at a second rate which lies between that of said control data and the line frequency, means for periodically setting said second pulse signal by said control data, and means for periodically setting said first pulse signal by said second pulse signal.

10. Receiving equipment as claimed in claim 9, characterized in that said television signal additionally contains a digitally modulated sound or data component which is scrambled to allow only for its authorized reception, said equipment comprising means for deriving said scrambled data component, means for descrambling said scrambled sound/data component under the control of a second scrambling key, means for generating a third pulse signal, having a third pseudo random configuration, at a third rate appropriate to the sound-/data component, which third pulse signal forms said second scrambling key, and means for periodically setting said third pulse signal, by daid second pulse signal to a particular pulse configuration, which third pulse signal thereafter is stepped in accordance with its randon configuration.

11. Receiving equipment as claimed in claim 9 or 10, characterized in that said means for generating said second pulse signal generates that signal at a rate which corresponds to the frame frequency of said television signal.

12. Receiving equipment as claimed in claim 9 or 10 characterized in that said control data is conveyed in encrypted form as an encryption key in said television signal, said equipment further comprising means for deriving said encryption key from said television signal and means for decrypting said encryption key to produce said control data.

13. Receiving equipment as claimed in claim 11, characterized in that said control data is conveyed in encrypted form as an encryption key in said television signal, said equipment further comprising means for deriving said encryption key from said television signal and means for decrypting said encryption key to produce said control data.

14. A system as claimed in claim 3, characterized in that said control data is conveyed in encrypted form as an encryption key which forms part of the transmitted television signal.

15. Transmission equipment as claimed in claim 7, characterized in that said equipment further comprises means for encrypting said control data to form an encryption key, which encryption key forms part of the television signal.

* * * * *